(12) United States Patent
Owens et al.

(10) Patent No.: US 7,089,262 B2
(45) Date of Patent: *Aug. 8, 2006

(54) METHOD AND APPARATUS FOR OBJECT ORIENTED STORAGE AND RETRIEVAL OF DATA FROM A RELATIONAL DATABASE

(75) Inventors: Gary L. Owens, Mountain View, CA (US); David S. Labuda, Half Moon Bay, CA (US)

(73) Assignee: Portal Software, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/375,694

(22) Filed: Feb. 26, 2003

(65) Prior Publication Data

US 2003/0204514 A1 Oct. 30, 2003

Related U.S. Application Data

(63) Continuation of application No. 09/454,519, filed on Dec. 6, 1999, now Pat. No. 6,529,915, which is a continuation of application No. 08/856,375, filed on May 14, 1997, now Pat. No. 6,047,284.

(51) Int. Cl.
*G06F 17/30* (2006.01)
*G06F 17/00* (2006.01)
(52) U.S. Cl. .............................. 707/103 R; 707/103 Y
(58) Field of Classification Search .................. 707/4, 707/100, 101, 103 R; 705/34; 717/137, 717/141
See application file for complete search history.

(56) References Cited

U.S. PATENT DOCUMENTS

| | | | | |
|---|---|---|---|---|
| 5,212,787 | A | * | 5/1993 | Baker et al. ................. 707/101 |
| 5,291,583 | A | * | 3/1994 | Bapat ......................... 717/137 |
| 5,504,885 | A | * | 4/1996 | Alashqur .................... 717/141 |
| 5,937,406 | A | * | 8/1999 | Balabine et al. ............ 707/100 |
| 6,047,267 | A | * | 4/2000 | Owens et al. ................. 705/34 |
| 6,047,284 | A | * | 4/2000 | Owens et al. .................. 707/4 |
| 6,529,915 | B1 | * | 3/2003 | Owens et al. ........... 707/103 R |

OTHER PUBLICATIONS

Agarwal et al., "Architecting Object Applications for High Performance with Relational Databases", Aug. 10, 1995, pp. 1-8.*
Pierre et al., Issues in Crosswalking Content Metadata standards, Oct. 15, 1998, National Information Standards Organization, pp. 1-8.*
Iannella et al., Metadata:Enabling the Internet, Jan. 1997, Research Data Network CRC, pp. 1-7.*

* cited by examiner

*Primary Examiner*—Apu M. Mofiz
(74) *Attorney, Agent, or Firm*—Levine Bagade LLP

(57) ABSTRACT

Systems and methods for accessing a relational database through an object-oriented querying interface are provided. A class of objects that are to be stored in the relational database are defined. One or more relational database tables are created and a mapping is produced that maps each data member of an object to one or more columns in a relational database table. Additionally, object-oriented paradigms like inheritance may be supported and the allocation of storage for array elements may be deferred until necessary.

19 Claims, 16 Drawing Sheets

Account_T — 251

| Id | Name | Last_Billed |
|---|---|---|
| 3456 | John Doe | "4/1/1997" |
| ... | | |

Account_Balance_T — 253

| Id | Elemt_Id | Name | Current_Balance | Credit_Limit |
|---|---|---|---|---|
| 3456 | 840 | U.S. Dollars | 500 | 10,000 |
| 3456 | 1004 | Yen | 1000 | 200,000 |
| ... | | | | |

*FIG. 6*

Account_Address_Phone_T ⎯ 403

| Id | Element_Id | Type | Number |
|---|---|---|---|
| 3456 | 56 | Home | 555-1111 |
| 3456 | 58 | Work | 555-1112 |
| ... | | | |

Account_Address_T ⎯ 401

| Id | Street | City |
|---|---|---|
| 3456 | Elm St. | San Jose |
| ... | | |

FIG. 9

METHOD AND APPARATUS FOR OBJECT ORIENTED STORAGE AND RETRIEVAL OF DATA FROM A RELATIONAL DATABASE

This is a Continuation of prior application Ser. No. 09/454,519, filed Dec. 6, 1999, now U.S. Pat. No. 6,529,915, which is a Continuation of U.S. application Ser. No. 08/856,375, filed May 14, 1997, now U.S. Pat. No. 6,047,284, both of which are hereby incorporated by reference.

BACKGROUND OF THE INVENTION

1. Field of the Invention

The present invention relates generally to methods and apparatuses for transferring data to and from a first memory that is organized according to an object-oriented scheme to a second memory that is organized according to a relational database management scheme.

More specifically, the invention relates in certain embodiments to methods and apparatuses for transferring data to and from a transient storage that is organized according to an object-oriented scheme to a persistent storage that is organized according to a relational database management scheme. In certain embodiments, the relational database in persistent storage is designed by an object server. This includes defining the tables of the relational database as well as the various columns. The object server then stores and retrieves data from the various tables defined in persistent storage according to a hierarchical tree that maps data encapsulated within objects to table locations in the relational database found in persistent storage.

2. Description of the Related Art

There are well known tradeoffs associated with relational database and object oriented database designs. Relational databases are commonly optimized for fast, efficient searching. This is largely the result of the fact that relational databases are built from a set of tables that contain related columns. The tables are indexed in an efficient manner by the relational database so that searches may be performed in an optimal manner. While organizing information into a complex related set of tables helps speed searching, a thorough knowledge of the tables is required to specify data that is to be retrieved or to specify where data is to be stored. Furthermore, changing the structure of the tables to add a column may require extensive programming and rewriting of existing code. Another problem in many relational database management systems (RDBMSs) is that columns in tables that contain no information or are not used nevertheless take up space in memory.

A standard relational query language, Structured Query Language (SQL) is used to query most popular relational databases. SQL requires that the person who specifies a query know what tables and columns contain the information that is to be compared against the query. For example, in order to look for all customers in a city, the user must know both the name of the table that contains city information and also the name of the column in that table that contains the city information. It is also necessary that the user know the tables that should be joined to accomplish the search. Likewise, in order to store information in the proper column of the proper table, the user must know the name of the table and column in which the information should be stored.

In contrast, it is easier to query, modify and write information to object-oriented databases. Instead of specifying a table and column for storing or retrieving information, related data is encapsulated in an object. The object may be read into memory and all encapsulated data may be readily accessed. Searching, however, is not as efficient as relational database searching. Entire objects are read into memory in order to check the relevant encapsulated data members. Similarly, store operations are performed on entire objects. Thus, this methodology is not very well suited for on-line transaction processing (OLTP) where transaction rates are high but often only portions of the objects are desired.

Attempts to make object-oriented relational databases have for the most part merely added an object-oriented interpretation to a relational database structure. For example, rows in an existing relational database structure may be interpreted as an object, with each column representing an encapsulated data member. This arrangement, however, does not realize the full power of an object-oriented database. For example, inheritance is not supported so subclasses of objects may not be defined. Additionally, the problem of adding data members to objects is not addressed. Still further, adding a column with no data still allocates large chunk of storage for that column, even if the column is never used.

In view of the foregoing, there is a need for methods and apparatuses for taking advantage of the programming, storage and querying ease of an object-oriented database while enjoying the searching speed of a relational database.

SUMMARY OF THE INVENTION

Accordingly, the present invention provides an object server that maps data that is represented in transient memory according to an object-oriented scheme to data that is represented in persistent memory according to a relational database scheme. In certain embodiments, the object server generates appropriate tables and columns for a relational database scheme automatically so that an object-oriented scheme generated by a user may be efficiently stored and searched in persistent memory. Preferably, array elements are represented as rows in a table, not as columns so that storage space is not wasted with place holder data.

It should be appreciated that the present invention can be implemented in numerous ways, including as a process, an apparatus, a system, a device, a method, or a computer readable medium. Several inventive embodiments of the present invention are described below.

In one embodiment, the invention provides a computer implemented method of storing objects in a relational database comprising the steps of: defining a class of objects that are to be stored in the relational database, the objects of the class having at least one data member; creating at least one relational database table to store the objects of the class; and mapping each data member to at least one column in the at least one relational database table. Subclasses of objects may be defined that inherit the data members of a parent class. The data members for objects of the subclass are typically stored in additional relational database tables.

In another embodiment, the invention provides a computer implemented method of querying a relational database comprising the steps of: receiving a first query that is object-oriented and specifies information about objects of interest; instantiating a query container object that comprises a query template based on the first query, an array for any arguments in the template query, and an array for any results in the template query; utilizing the query container object, translating the first query into a second query in a relational database query language for accessing the specified information about the objects of interest that are stored by a relational database management system; sending the second query to the relational database management system; and receiving the specified information about the objects of interest from the relational database management system. Additionally, a results container object may be instantiated to store the specified information about the objects of interest.

In another embodiment, the invention provides a computer implemented method of deferring allocation of storage for array elements of objects comprising the steps of: receiving a request to instantiate an object of a class where the class has a definition that specifies a default value for each data member of an array element; allocating storage space for the object without storage space for an array element if the instantiation request does not specify an initial value for any of the data members of the array element; receiving a request to modify a data member of the array element; determining if storage space for the array element has been allocated; if storage space for the array element has not been allocated, allocating storage space for the array element and initializing each data member of the array element to the specified default value; and modifying the data member of the array element as specified in the modification request.

In another embodiment, the invention provides a computer system for storing objects in a relational database comprising: an object-oriented application for receiving a definition of a class of objects that are to be stored in the relational database, the objects being stored in a transient storage; a memory for the transient storage of the objects; an object server for retrieving the objects from the memory and issuing statements in a relational database query language to store data of the objects; and a relational database management system for receiving the statements and storing the data of the objects in persistent storage as relational database tables.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 6 illustrates relational database tables that may be generated by an object server of the invention to store objects of the class defined in FIG. 4.

FIG. 9 illustrates the additional relational database tables that may be generated to store the additional data members of objects of the subclass defined in FIG. 8.

DETAILED DESCRIPTION OF THE PREFERRED EMBODIMENTS

Reference will now be made in detail to the preferred embodiments of the invention. An example of a preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims along with their full scope of equivalents. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
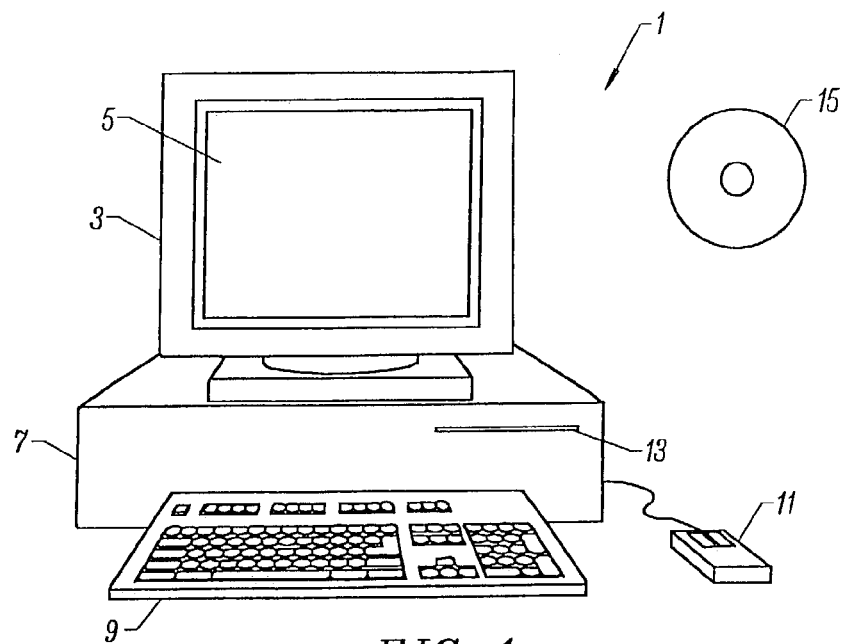
FIG. 1 illustrates an example of a computer system that may be utilized to execute the software of an embodiment of the present invention.

FIG. 1 illustrates an example of a computer system that may be used to execute the software of an embodiment of the present invention. FIG. 1 shows a computer system 1 which includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the present invention, data for use with the present invention, and the like. Although the CD-ROM 15 is shown as an exemplary computer readable storage medium, other computer readable storage media including floppy disks, tape, flash memory, system memory, and hard drives may be utilized.

Figure 2:
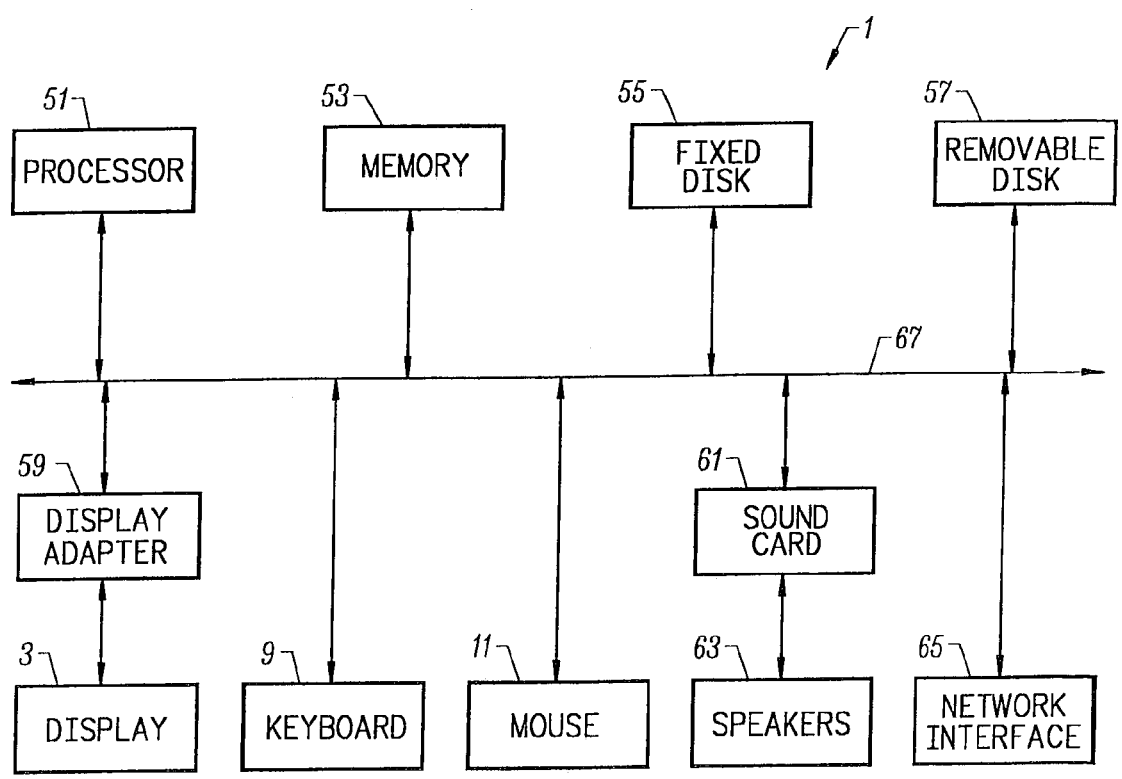
FIG. 2 shows a system block diagram of the computer system of FIG. 1.

FIG. 2 shows a system block diagram of computer system 1 used to execute the software of an embodiment of the present invention. As in FIG. 1, computer system 1 includes monitor 3 and keyboard 9, and mouse 11. Computer system 1 further includes subsystems such as a central processor 51, system memory 53, fixed disk 55 (e.g., hard drive), removable disk 57 (e.g., CD-ROM drive), display adapter 59, sound card 61, speakers 63, and network interface 65. Other computer systems suitable for use with the present invention may include additional or fewer subsystems. For example, another computer system could include more than one processor 51 (i.e., a multi-processor system), or a cache memory.

Arrows such as 67 represent the system bus architecture of computer system 1. However, these arrows are illustrative of any interconnection scheme serving to link the subsystems. For example, a local bus could be utilized to connect the central processor to the system memory and the display adapter. Computer system 1 shown in FIG. 2 is but an example of a computer system suitable for use with the present invention. Other configurations of subsystems suitable for use with the present invention will be readily apparent to one of ordinary skill in the art. t to one of ordinary skill in the art.

A system for tracking multiple payment resources and charging transactions to payment resources in an OLTP system is disclosed in U.S. patent application Ser. No. 08/856,313, filed May 14, 1997, now U.S. Pat. No. 6,047,267, which is herein incorporated by reference for all purposes. Additionally, a system for providing a clean accounting close for a real time billing system is disclosed in U.S. patent application Ser. No. 08/856,372, filed May 14, 1997, now U.S. Pat. No. 6,092,055, which is herein incorporated by reference for all purposes.

Figure 3:
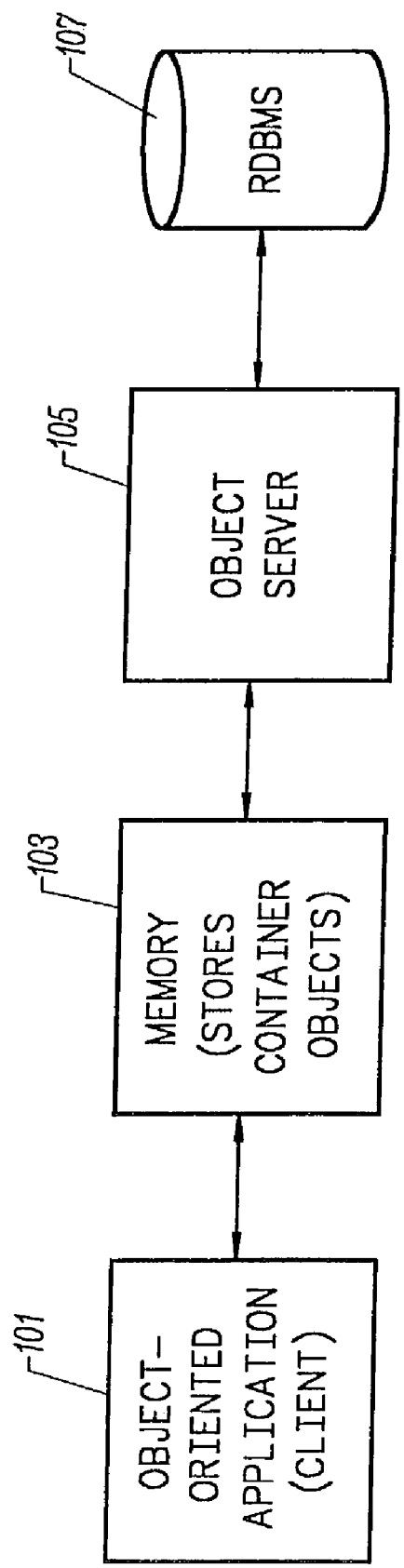
FIG. 3 shows a block diagram of an embodiment of the invention which provides an object-oriented interface to objects that are stored by a relational database management system.

FIG. 3 shows a block diagram of an object-oriented application that stores objects in a relational database. An object-oriented application 101 allows object-oriented creation, manipulation, and searching of objects. In traditional client-server nomenclature, application 101 is the client and it typically operates on a computer system. The computer system may be similar to the one shown in FIG. 1.

As objects are created or accessed by application 101, the objects are stored in memory 103. The memory may be generally thought of as transient storage—meaning that the storage is only temporary and is not the permanent storage of the objects. Typically, memory 103 is the dynamic random access memory of the computer system on which the client computer system operates. Of course, memory 103 is not limited to any specific memory-type as it may be cache memory, flash memory, hard drive, floppy disk, and the like.

An object server 105 provides the interface between the object-oriented scheme and the relational database scheme. The object server is a process that translates object-oriented requests into relational database requests (e.g., SQL). Typically the object server operates on the same computer system as the object-oriented application. However, there is no requirement that the object server operate on the same computer system or at the same location (e.g., the two computer systems may be in communication over a network).

The object server sends relational database requests to a relational database management system (RDBMS) 107. The RDBMS stores data in relational tables with columns in the tables representing data of the same type. Although the RDBMS typically operates on a different computer system than the object server, the RDBMS may operate on the same computer system. In traditional client-server nomenclature, RDBMS 107 is the server. In a preferred embodiment, the RDBMS is from Oracle Corporation, Redwood Shores, Calif.

Object-oriented environments are intended to shield the implementation from the user. More specifically, in database applications an object-oriented environment hides the details of how the objects are stored. This is in stark contrast to traditional relational database applications where it is generally required for a user to know how data is stored in order to formulate queries on the data. It may be beneficial at this point to illustrate an example of how the present invention may store an object in a relational database scheme.

In object-oriented environments, a class defines a group of objects that share the same characteristics. More specifically in this context, each object (or instance) of a class may have the same data members. An object is created by being instantiated as a member of a class.

Figure 4:
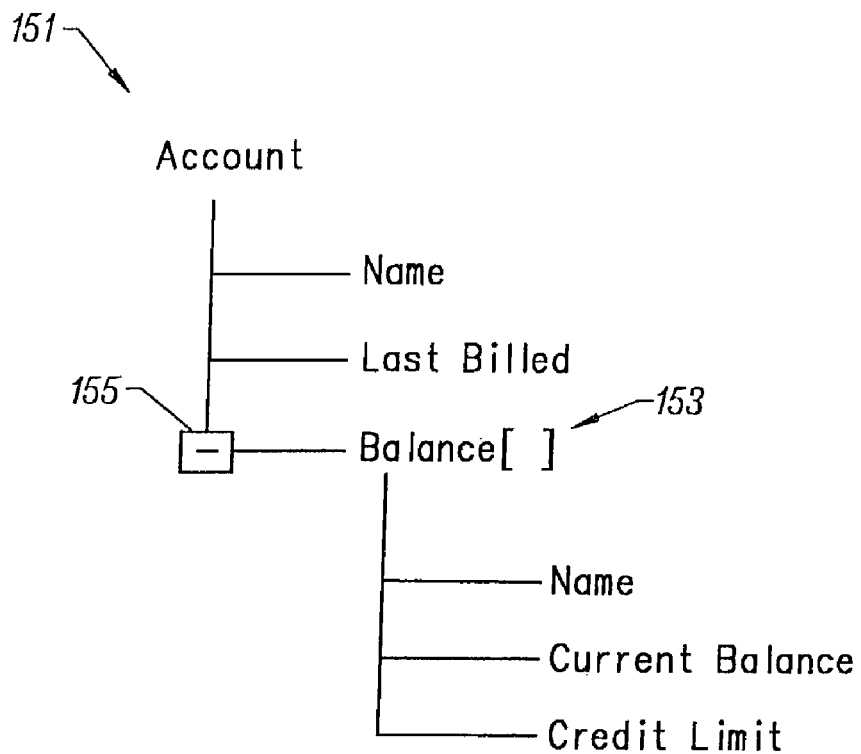
FIG. 4 shows a graphical hierarchical tree that may be utilized to define a class of objects.

FIG. 4 shows a graphical hierarchical tree that may be utilized to define a class of objects. A graphical hierarchical tree 151 defines a class named "Account" which three data members. In this example, a class for an accounting system will be defined. However, this example is intended to aid the readers understanding of the invention and does not limit the invention to any specific embodiment.

Data member "Name" represents the name of a customer. Data member "Last Billed" represents the date that the customer was last sent a bill. Lastly, data member "Balance" is an array where each element of the array may store three data members. The graphical hierarchical tree indicates that "Balance" is an array by the brackets indicated by arrow 153. The minus sign in box 155 may be activated to collapse the data members of Balance as is commonly done in conventional graphical user interfaces (GUIs).

Each element of the array Balance may include a data member "Name" which represents the currency of the units of the balance, a data member "Current Balance" which represents the current balance, and a data member "Credit Limit" which represents the credit limit. Although this is a very simple example, it illustrates many of the advantages of object-oriented data storage. For example, it is easy for a user to define a class of objects. The user may use pull-down menus to select a type of data member (e.g., integer). Then the user may drag and drop the new data member on the graphical hierarchical tree at the desired location.

A significant advantage of an object-oriented is inheritance. Inheritance allows one class, the subclass, to inherit or receive all the characteristics of a higher or parent class. Inheritance allows a user to tailor new classes off of an existing class, therefore resulting in a reuse of resources. An example of a subclass of Account will be described in more detail in reference to FIGS. 8–10.

A hierarchical tree provides a hierarchy for the data members. Accordingly, the system does not have trouble distinguishing Name which is a data member of each Account object and Name which is a data member of each Balance array element.

Figure 5A:
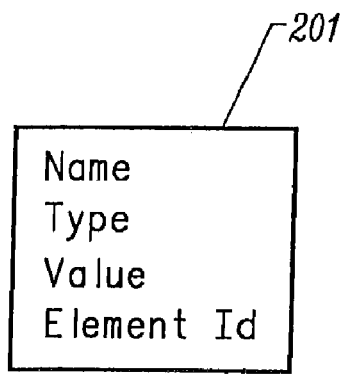
FIG. 5A shows a structure of a data block utilized to store container objects and FIG. 5B shows a container object for storing an object in transient memory.
Figure 5B:
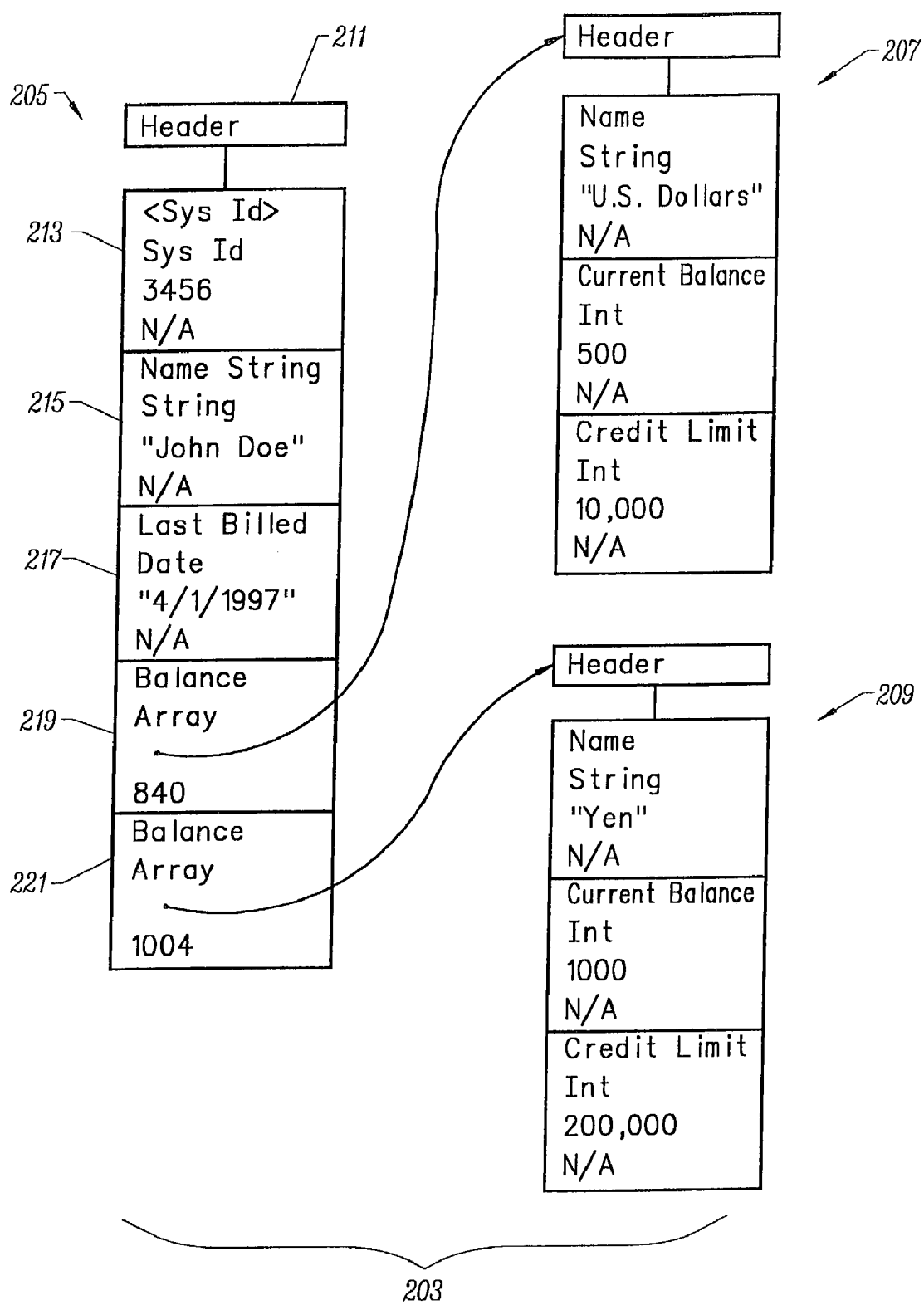

In order to provide a thorough understanding of the invention, FIGS. 5A and 5B show a container object for storing an object in transient memory. However, it should be understood that the actual implementation of the container object is not apparent to the user. FIG. 5A shows the structure of a data block that may be utilized to store a container object.

A data block 201 includes four fields for storing the following information:

Name—indicates the name of the data in the data block

Type—indicates the data type of the data in the data block

Value—stores the value of the data in the data block

Element Id—indicates the id of an element of an array

In order to better understand the data blocks, one should refer to FIG. 5B which shows a container object 203 which stores an object of the class defined in FIG. 4. The container object includes a main container 205 and two subcontainers 207 and 209.

Main container 205 includes a header 211 which is for storing any information about the main container (e.g., number of subsequent data blocks and their location in memory). Following the header, there are one or more data blocks that have the same structure as the data block shown in FIG. 5A.

Referring to a data block 213, the Name of the data block is <Sys Id> indicating that this data block stores a system id for the object, which may be thought of as the name of the object from the system's point of view. In a preferred embodiment, the Sys Id includes a type string, id number, database number, and revision number.

In data block 213, the Type is "Sys Id" indicating that this data block identifies an object. The Value of the data block stores 3456 which is a number which will be utilized to join relational tables storing data members for this object. Accordingly, this number will be referred to as the "Id" when discussing the relational database tables storing the object. As mentioned in the preceding paragraph, the Sys Id may be a compound data type including an id number. Thus, in some embodiments, the Id (e.g., 3456) is a portion of the Sys Id. Lastly, the Element Id is "N/A" (not applicable) as this data block does not store an element of an array. Thus, it should not matter what is stored in the Element Id field.

Although data block 213 contains the same fields as the other blocks, it is a unique block as it identifies an object. Accordingly, a better understanding of the data blocks will be achieved from a detailed discussion of the subsequent data blocks.

A data block 215 stores a data member of the object. The Name field contains "Name" which is the name of the first data member of the class that is defined in FIG. 4. The Type of the data block is "String" which indicates the Value field stores a string which is shown as "John Doe." As the data block does not store an element of an array, the Element Id field is not applicable.

A data block 217 stores another data member of the object. The Name field contains "Last Billed" which is the name of the second data member of the class (see FIG. 4). The Type of the data block is "Date" which indicates the Value field stores a date which is shown as a string for Apr. 1, 1997. As the data block does not store an element of an array, the Element Id field is not applicable.

A data block 219 stores an element of the array "Balance" utilizing subcontainer 207. The Name field contains "Balance" which is the third data member (an array) of the class (see FIG. 4). The Type of the data block is "Array" which indicates the Value field stores an element of an array. The Value field stores an element of the array by storing a pointer to subcontainer 207 which stores the data members of the element. The Element Id field contains the number 840, which according to the International Standards Organization (ISO) specifies U.S. dollars. Although in this particular example the Element Id field has a specific meaning in addition to identifying an array element, typically the Element Id field acts to identify the array element. The Element Id field will be utilized to join relational tables storing data members for this object.

Subcontainer 207 contains three data blocks which indicate that this object has a Current Balance of 500 U.S. Dollars and a Credit Limit of 10,000 U.S. Dollars. The first data block indicates the currency of the other two data blocks.

A data block 221 stores another element of the array "Balance" utilizing subcontainer 209. Thus, each element of the array may include a data block and a subcontainer. Substructures are implemented similar to arrays and may be thought of as an array with one element (the Element Id may be inapplicable though). Of course, there is no limit to the complexity of the objects stored under this implementation. For example, an array may contain an array, which contains an array, and so on.

Although the data blocks were shown in the same order as the data members were represented in the graphical hierarchical tree defining the class shown in FIG. 4, it is not necessary that the data blocks be stored in any particular order. For example, when an element is added to an array, the data block for the new element may be added to the end of the main container.

Putting the container object shown in FIG. 5B into perspective, the container object is typically stored in memory 103 shown in FIG. 3. Therefore, the container objects are the method of communicating data (along with API calls) between the object-oriented application and the object server. Now it may be beneficial to describe the way the object will be stored in the relational database as relational tables.

FIG. 6 illustrates relational database tables that may be generated by the object server to store objects. A relational database table (Account_T) 251 is the main relational table for the objects. As shown, the table includes columns entitled "Id," "Name" and "Last_Billed." The Id refers to a number that will be utilized to identify this object in the relational database and therefore, join relational database tables. In some embodiments, a Sys_Id column may be utilized in place of the Id column where the value in the Sys_Id column is compound data type to identify the object where Id is included in the Sys_Id. The Name and Last_Billed columns store data members of the object (see FIG. 4).

A relational database table (Account_Balance_T) 253 stores elements of the array "Balance." As shown, the table includes a column entitled "Id" which stores the id of the object for which the data in this table belongs. As one familiar with relational databases will recognize, the Id will be utilized to join relational database tables 251 and 253. Table 253 also includes a column entitled "Element_Id" which designates the element id of this element. In the instant case, the element id designates the currency of the data in the balance element. Lastly, table 253 includes columns entitled "Name," "Current_Balance" and "Credit_Limit" which may be data members of an element of the array Balance (see FIG. 4). In some embodiments, the Name column is located in a different relational database table but it is shown here in table 253 for simplicity.

Additionally, the value in the Element_Id column is utilized to identifyBalance array elements. Each Balance array element is stored in the relational database as a row in a relational table. Accordingly, storage space need only be allocated for those array elements that have been declared. In some embodiments, the allocation of storage space for array elements is deferred until needed in order to save storage space. This process will be described in more detail in reference to FIG. 17.

It should be readily apparent that by storing data members of objects in relational database tables, one may use conventional relational database management systems to query the relational database tables. Other features of the invention that will be described in more detail below are that array elements are easily added to an object by the addition of another row of a relational database table, subclasses may be defined which inherit the data members of a higher or parent class, and array elements of objects need not be allocated until actually utilized (this will also be called "lazy allocation of array elements").

Figure 7:
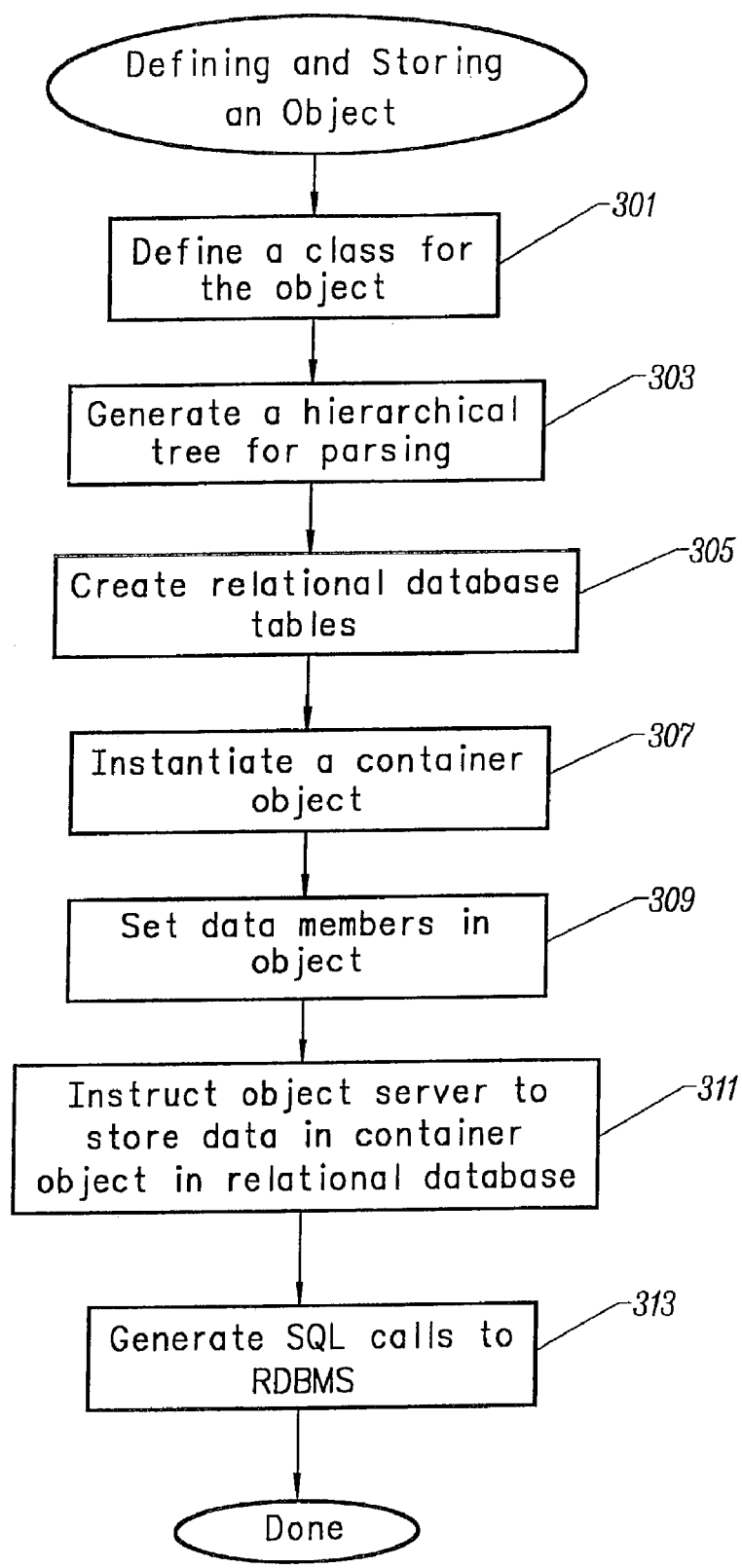
FIG. 7 shows a process of defining and storing an object in a relational database.

FIG. 7 shows a process of defining and storing an object in the relational database. At step 301, the user defines a class for the object. The class may be parent class or a subclass that inherits characteristics from another class. For the moment, assume the user defines the class shown FIG. 4.

The object-oriented application analyzes the class definition and generates a hierarchical tree for parsing at step 303. The hierarchical tree includes information for mapping an object's data members to columns in a relational database table. Accordingly, the hierarchical tree is parsed in order to map from the object-oriented scheme to the relational database scheme. The hierarchical tree also includes information about inheritance between or among classes as will be shown in FIG. 10.

At step 305, the object-oriented application instructs the object server to generate the requisite relational database tables. The object server then sends SQL calls to the RDBMS to generate the specified tables. At this point, the relational database tables have been generated but they do not contain any data.

In order to store an object in the relational database, the object-oriented application instantiates a container object at step 307. The container object will store the data members of the object while it is in transient memory. The user sets the value of data members of the object at step 309.

When a class is being defined, the user may specify certain characteristics of the data members. These characteristics are stored in the hierarchical tree that is utilized to map between the object-oriented scheme and the relational database scheme. For example, the user may specify that a data member is mandatory for an object of the class. The system then verifies that every object created of that class contains a value for that data member. Conversely, the user may specify a data member is optional so that the data member is not required for every object of the class.

The user may also specify that data members have default values. These default values will also be stored in the hierarchical tree and may be utilized to initialize an optional data member if no initial value is specified. If no value is specified for a mandatory data member, the user is informed that this is an error.

Additionally, default values may be utilized for the lazy or late allocation of array elements. An array element with a default value for each data member of the array element need not be allocated storage space in the container object (and therefore the relational database tables) until the array element is accessed or modified. Thus, only when an array element is actually needed is the storage space allocated. This feature of the invention provides significant storage savings.

At step 311, the object-oriented application instructs the object server to store the object in the relational database. The application sends an API call to store an object along with a reference or pointer to the container object. The data in the container object includes the values for the data members of the object.

The object server references the container object and generates SQL calls to the RDBMS to store the data in the appropriate relational database tables. The RDBMS will generate the necessary new rows and store the data in the appropriate columns of the relational database tables.

The above has described a simple example where the defined class is a highest level class (i.e., is not a subclass so it does not inherit characteristics from a parent class). One of the powerful features of the invention is that subclasses may be defined and objects of those classes inherit characteristics (e.g., data members) from a parent class and may be stored in the relational database.

Figure 8:
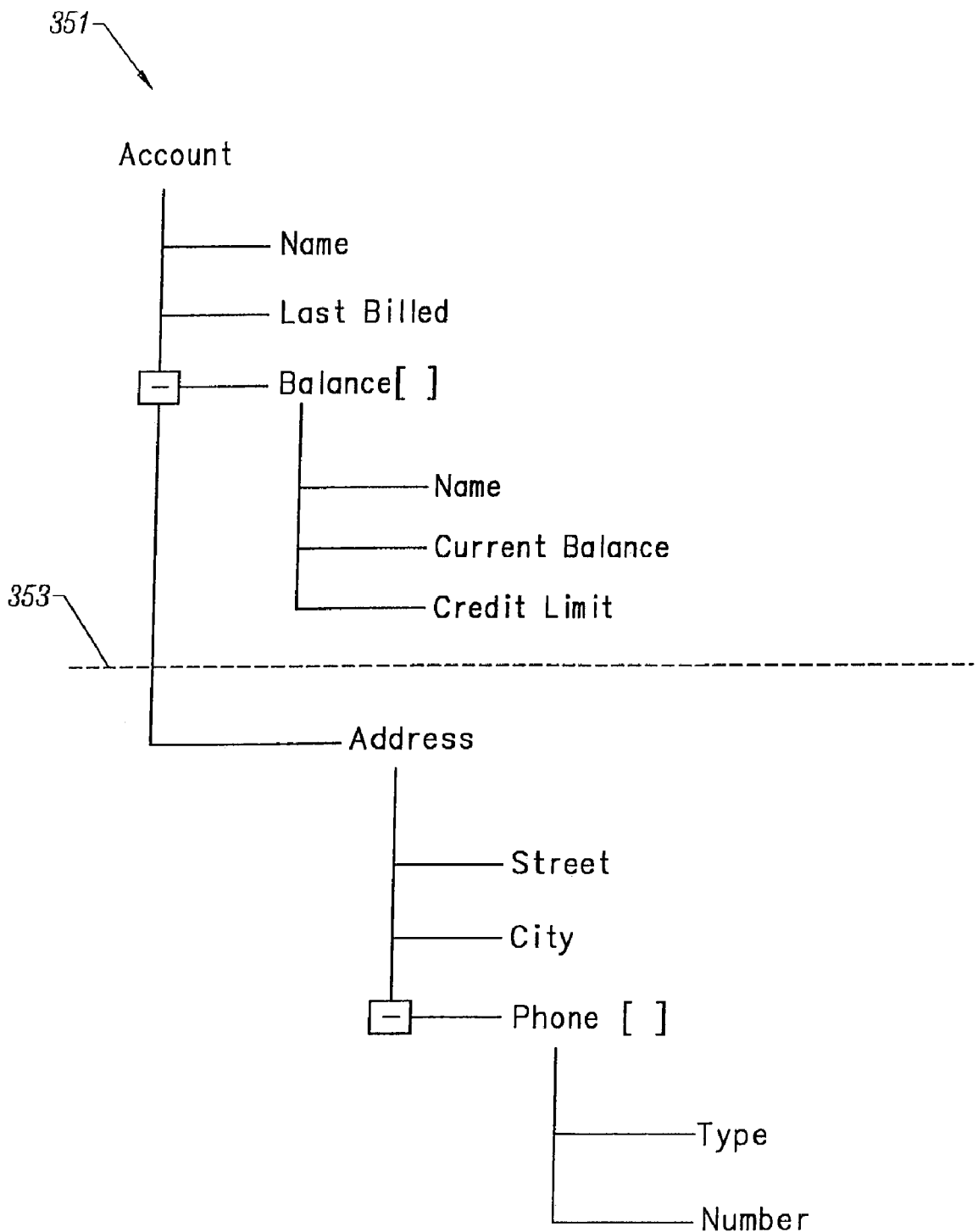
FIG. 8 shows a graphical hierarchical tree that may be utilized to define a subclass of objects (e.g., subclass of the class shown in FIG. 4).

FIG. 8 shows a graphical hierarchical tree that may be utilized to define a subclass of objects. A graphical hierarchical tree 351 is shown that is divided into two halves by a dashed line 353. The top half of the graphical hierarchical tree is the same as shown in FIG. 4. Thus, the subclass being defined inherits the characteristics of the class "Account."

As shown, the subclass adds a new data member "Address" which is a substructure including a data member named "Street," a data member named "City" and a data member named "Phone" which is an array. Each element of the array Phone may have a data member named "Type" and a data member named "Number." As an example, the Type data member may indicate the Number of the Phone element is a home phone number.

The container object for storing an object of the subclass may look similar to the one shown in FIG. 5B with an additional data block in the main container for the Address that points to a subcontainer that stores the data members for the Address. This subcontainer will also have a data block that points to a subcontainer for each element of the array Phone.

FIG. 9 illustrates the additional relational database tables that may be generated to store the additional data members of objects of the subclass. A relational database table (Account_Address_T) 401 stores data for the two nonarray data members of Address. As shown, a single address has been stored in the relational table. The Id column indicates that this is an address for John Doe as it has the same id number. The relational database system will utilize this column to perform joins on the relational database tables.

A relational database table (Account_Address_Phone_T_) 403 stores data for each element of the array Phone. As shown, there are two elements present with element being a row in the relational database table. Each row includes an Id and an Element_Id, in addition to the data member columns. Since each element of an array is represented as a row in a relational table, it is easy to add new elements to the array as new rows since RDBMS are designed to add new data in this fashion.

Although adding new rows to relational database tables is quite easy, this is not the case with adding new columns. For this reason, in some embodiments, the data members defined in subclasses are constrained to be stored as substructures and arrays by the RDBMS. As mentioned earlier, substructures may be thought of conceptually as a one element array. Both substructures and arrays are represented in the relational database as new tables.

Figure 10:
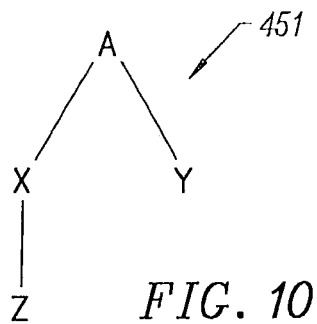
FIG. 10 shows a hierarchical tree that may be maintained to store the relationship of classes and their characteristics.

FIG. 10 shows a simple representation of the hierarchical tree that may be maintained to store the relationship of the classes and their characteristics. A hierarchical tree 451 includes a node for each related class and subclass. The topmost node A represents the parent class. The nodes X and Y are subclasses of the parent class and therefore inherit characteristics of the parent class. Node Z represent a subclass of the class X so it inherits characteristics of both the parent and grandparent classes.

At each node is stored information to map each data member of the class to one or more columns in the relational database tables. For example, a mapping from the data member Current Balance of the subclass to the relational database column Account_Balance_T.Current_Balance (see FIG. 6). Additionally, each node will store other characteristics of the data members of objects of the class (e.g., default values).

The hierarchical tree allows a user to define a class hierarchy that is arbitrarily complex and each class itself may be arbitrarily complex. For example, at any node in the hierarchical tree, there may be any number of data members, structures, arrays or nesting of these data types (limited only by the capacity of the computer system or software).

Figure 11:
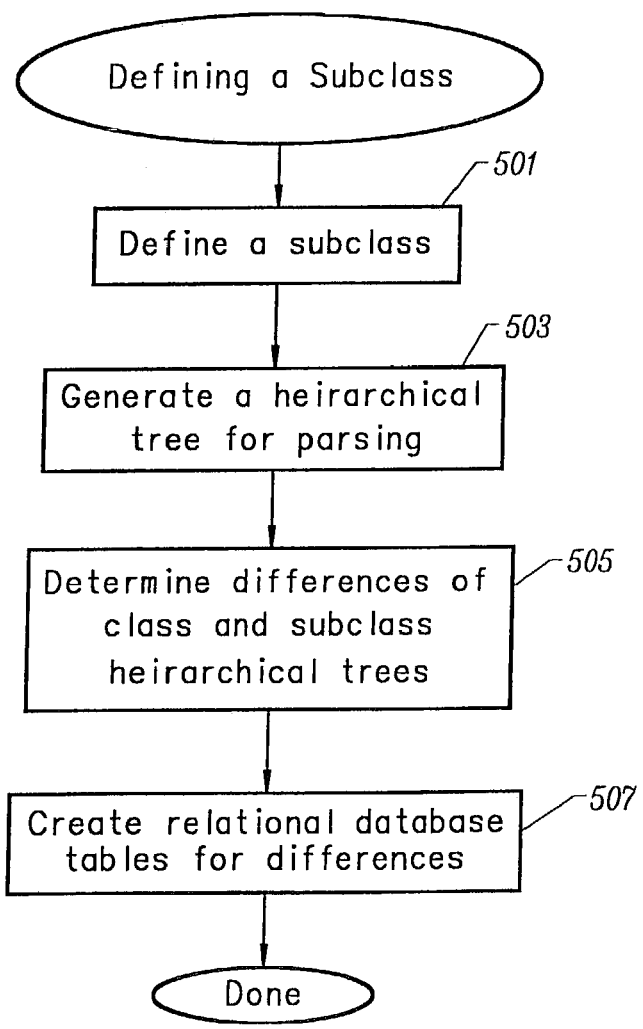
FIG. 11 shows a process of generating a subclass.

Although FIG. 7 shows a process for both defining a class and storing an object of the class, these operations may be performed separately as will be demonstrated by a discussion of FIG. 11 which shows a process of generating a subclass. At step 501, the user defines a subclass as was discussed in reference to FIG. 8. The object-oriented application generates a hierarchical tree for parsing. This hierarchical tree includes characteristics of the subclass and the parent class from which it inherits.

At step 505, the object-oriented application determines a difference between the hierarchical tree for this subclass and the hierarchical tree for its immediate parent class. Conceptually, this would identify the new data members as is shown on the bottom half of FIG. 8.

The object-oriented application issues an API call to the object server generate the new tables for the differences between the hierarchical tree for the parent class and subclass at step 507. The object server issues the appropriate SQL calls to generate the additional relational database tables for objects of the subclass. Data members for the objects which are inherited from the parent class(es) will be stored in the relational database tables that were generated for each class. Thus, data members that are common to related objects will be stored in the same relational database tables. This provides a number of advantages including the following.

An advantage of the invention is that one is not limited to any one class during queries. For example, one may search for all objects that were billed last on Apr. 1, 1997. The RDBMS and the object server may return objects that, although related, are not the same class. Some objects may be of a parent class while other objects may be of a subclass, or a subclass of a subclass. The object server returns a list of objects in a container object that satisfy the query.

There are numerous API calls that may be issued to the object server. A detailed description of all the API calls is not necessary to understand the invention. However, it may be beneficial to illustrate a process of utilizing one of the available API calls. The API call that will be discussed deletes an object from the relational database.

Figure 12:
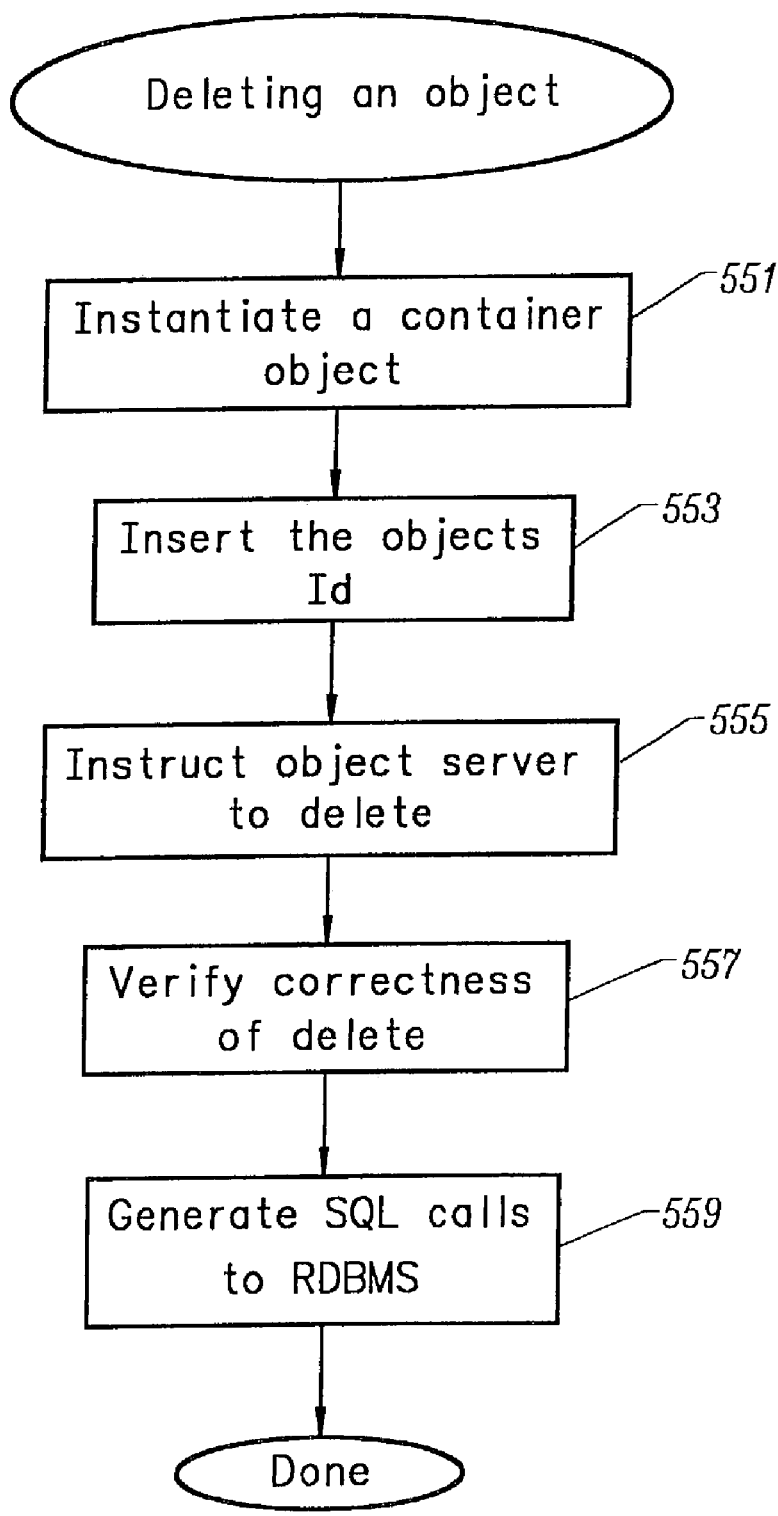
FIG. 12 shows a process of deleting an object.

FIG. 12 shows a process of deleting an object. At step 551, the object-oriented application instantiates a container object in transient memory. It is presumed that it is already known which object should be deleted (e.g., results from a search). The object to be deleted will be identified by the Id (or Sys Id), which is the id given to the object by the system.

At step 553, the object-oriented application inserts the Id of the object to be deleted into the container object. The application then issues an API call to the object server at step 555 instructing it to delete the object identified by the container object.

The object server then verifies that the Id in the container object specifies a valid object at step 557. After verification, the object server generates the appropriate SQL calls to delete the data in the relational database at step 559. In a preferred embodiment, the multiple SQL calls that may be necessary to delete an object from the relational database tables are performed as one atomic operation. In other words, the multiple SQL calls are performed as one operation conceptually so the user is not able to access a partially deleted object in the relational database. The one or more SQL calls to delete the oject are received by the RDBMS and executed to perform the deletion.

Figure 13:
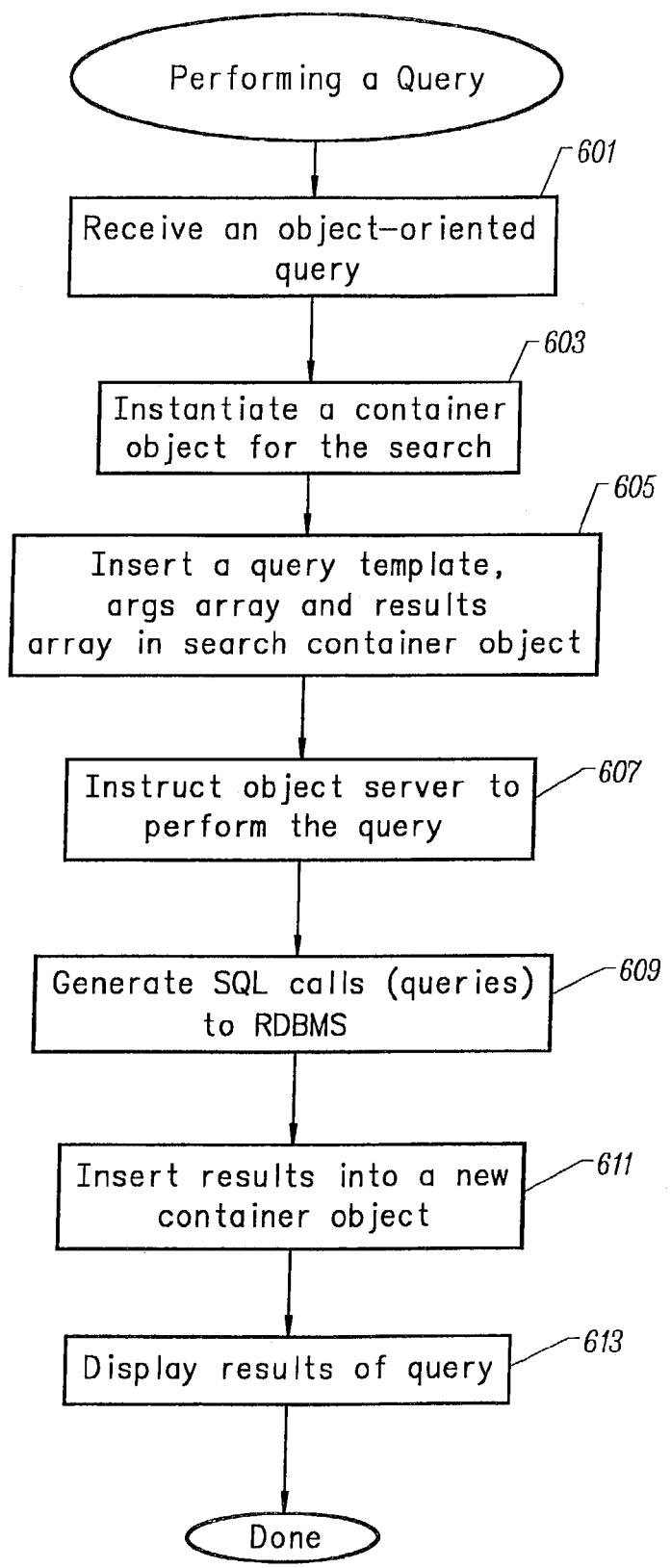
FIG. 13 shows a process of querying the relational database for information about objects of interest through an object-oriented interface.

The invention utilizes the power of relational database management systems to access objects that are stored in the relational tables. FIG. 13 shows a process of querying the relational database for information about objects of interest through an object-oriented interface. Before describing the figure, it may be beneficial to review some fundamentals of relational databases.

One of the most popular relational database query languages is SQL. The basic format of an SQL query is the following:

SELECT {columns} FROM {tables} WHERE {conditions}

As an example, suppose using the sample database described in FIGS. 4–6 that one wants to know the names of people who have accounts that were last billed on Apr. 1, 1997 and have a current balance greater than $100. An SQL query for this information may resemble the following:

SELECT Acount_T.Name FROM Account_T, Account_Balance_T WHERE Account_T.Last_Billed="Apr. 1, 1997" and Account_Balance_T.Current_Balance>100 and Account_T.Id=Account_Balance_T.Id As should be apparent, the user is required to know the way the data is stored in the relational database to form a correct query. For example, the last condition that specifies that the ids of the two tables are the same specifies how to link the two tables and is called a "join" operation.

Referring again to FIG. 13, the object-oriented application receives an object-oriented query at step 601. The object-oriented query will typically specify values of data members of objects of interest. The application instantiates a container object at step 603. As with any flowcharts depicted herein, there is no implied order of the steps simply by the way they are presented.

Figure 14:
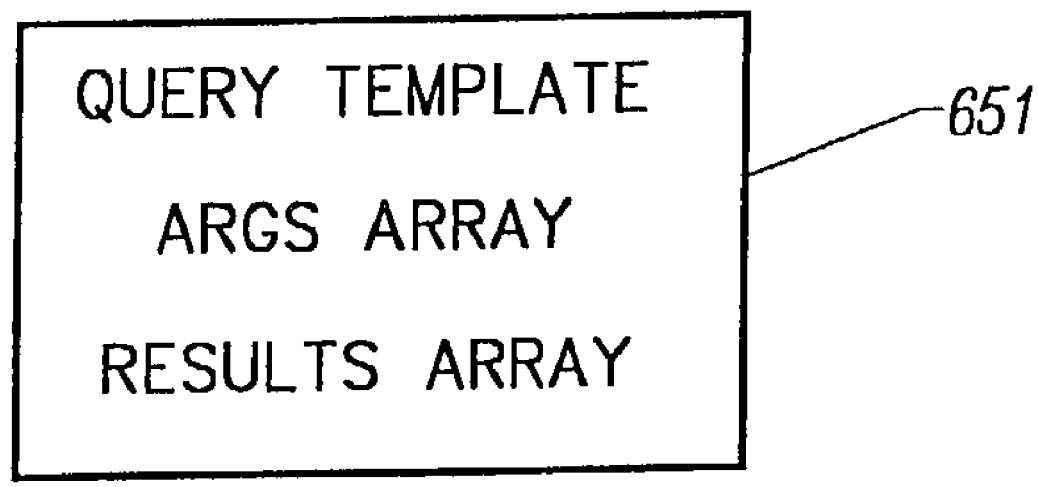
FIG. 14 illustrates a query container object that may be utilized in querying the relational database through an object-oriented interface.

In general, the application exchanges data with the object server through container objects stored in transient memory. Since this container object is for performing a query, we will call it a query container object. FIG. 14 illustrates a query container object that may be utilized in querying the relational database. As shown, a query container object 651 includes a query template, args (or arguments) array and a results array. The query template contains a query with gaps that are filled in by the args array and results array. The query container object will be described in more detail in reference to FIG. 15.

At step 607, the object-oriented application instructs the object server to perform the query. The application sends an API call to the object server that references the query container object. The object server analyzes the information in the search object container and generates SQL calls (or queries) for the RDBMS at step 609. This process will be described in more detail in reference to FIGS. 16A and 16B. After step 609, the object-oriented query has been translated into a relational database query.

In order to perform the query, the object server may send multiple SQL queries to the RDBMS. Once the object server receives the desired results, the object server instantiates a new container object and stores the results of the query in the container object. Although the results may be placed in the search object container, instantiating a new container object allows the original search object container to be unmodified which may be preferable.

At step 613, the object-oriented application retrieves the results of the query from the container object that stores the results in transient memory and displays the results. The results may be displayed any number of ways but are preferably displayed in an object-oriented fashion.

When a user specifies a query in an object-oriented system, the user specifies the desired data members of the objects of interest (or the whole object) along with the conditions that determine the objects of interest. Thus, the relational database query described above (i.e., SELECT Acount_T.Name FROM Account_T, Account_Balance_T WHERE Account_T.Last_Billed="Apri. 1, 1997" and Account_Balance_T.Current_Balance>100 and Account_T.Id=Account_Balance_T.Id) in an object-oriented environment would conceptually be "retrieve the Name data member of all objects of class Account where the Last Billed is equal to Apr. 1, 1997 and the Current Balance is greater than 100 dollars." The form of the object-oriented query may vary and the form of some embodiments will be described in the following paragraphs. However, it is important to notice that with an object-oriented query, the user is not required to know exactly how the objects are stored in memory. This is in stark contrast to conventional relational database systems as is illustrated by the SQL query.

Once the user has entered an object-oriented query, the object-oriented application fills in the query container object. Thus, the application inserts the query template, args array and results array into the query container object. The query template is an SQL-like query that includes object-oriented information as follows: SELECT { } FROM {class} WHERE {conditions without joins}

The query container object includes a results array which is an array which holds the data members and/or objects that should be returned from the relational database. Since the results array includes what is typically included in the SELECT clause, this clause may just have a place holder like 'X' as in some embodiments.

The FROM clause specifies the class of objects that should be searched. If a parent class is specified, then subclasses will satisfy the query also. Lastly, the WHERE clause specifies conditions like Data_Member1=Value1. Data_Member1 and Value1 are determined from the first element in the args array. Thus, the first element in the args array would specify an element of the Name "Last Billed," Type "Date" and a Value of "Apr. 1, 1997." The args array fills in the missing values of the query template which may be as follows:

SELECT X FROM Person WHERE Data_Member1=Value1 and Data_Member2>Value2

The SELECT clause has an X as a place holder so the query is easier to parse and looks better, but the results array will specify the data members and/or objects requested. As indicated above, the WHERE clause will be filled in from the args array but it should be noted that there are no joins specified.

Figure 15:
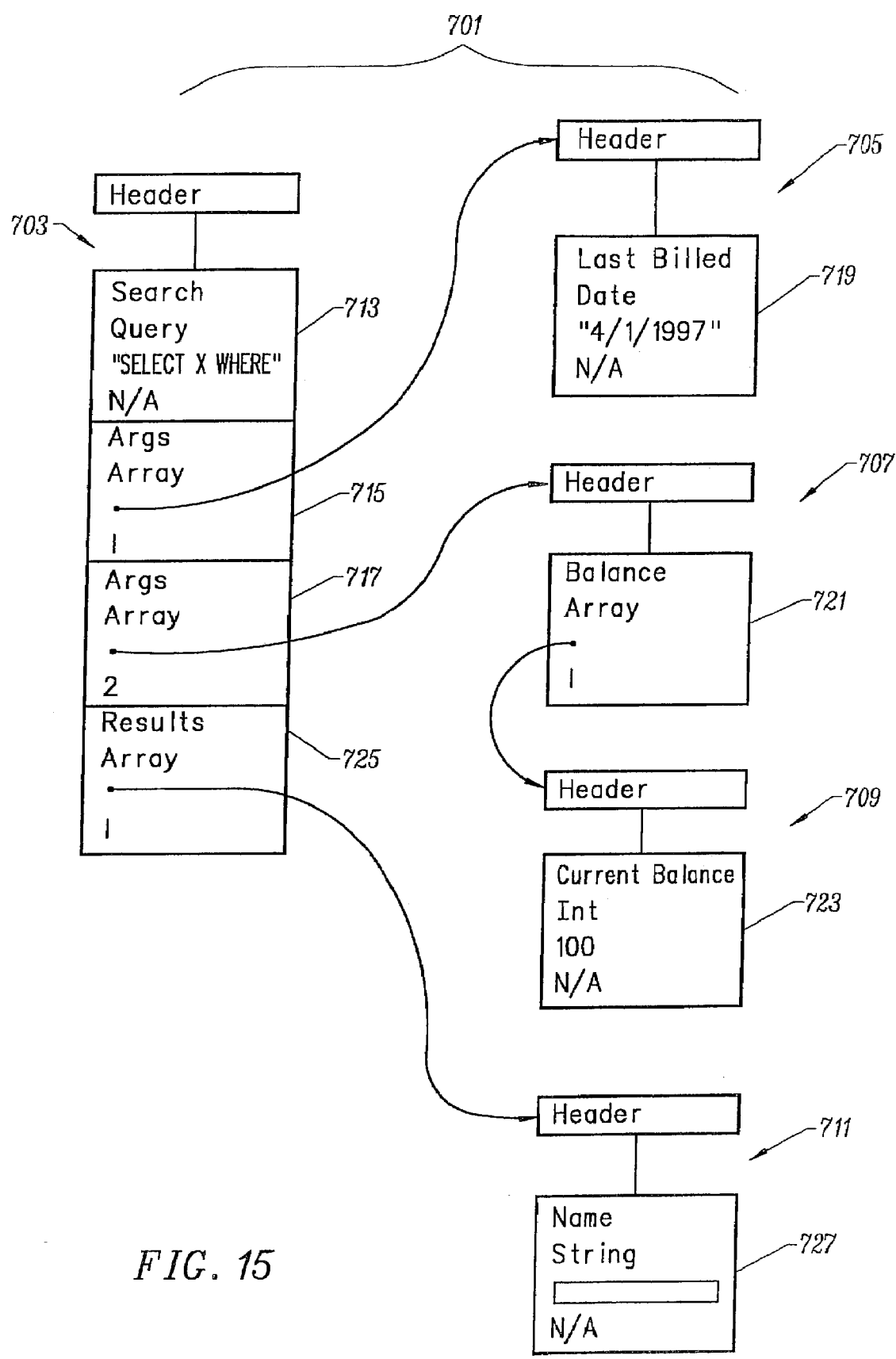
FIG. 15 shows a query container object that may be generated by the invention.

FIG. 15 shows a query container object that may be generated by the invention for the above search. A query container object 701 includes a main container 703 and subcontainers 705, 707, 709, and 711. A data block 713 in the main container stores the query template as discussed above. Data blocks 715 and 717 store the pointers to the elements of the args array. Data block 715 points to subcontainer 705 which includes a data block 719. Data block 719 includes the information to fill in one of the conditions of the query template (the operator '=' is already in the query template). The Name field indicates that Data_Member1 is the "Last Billed" data member and the Value field indicates that Value1 is "Apr. 1, 1997" (see FIG. 5A for details on the data blocks).

Similarly, data block 717 points to subcontainer 707 which includes a data block 721. Data block 721 points to an array element for the Balance array. Data block 721 points to a data block 723 which includes the information to fill in another of the conditions of the query template (the operator '>' is already in the query template). The Name field indicates that Data_Member2 is the "Current Balance" data member and the Value field indicates that Value2 is 100.

A data block 725 stores an element of the results array. Data block 725 points to subcontainer 711 which includes a data block 727 that indicates the results the query requests. As you may recall, the user wanted the name of the individual. Data block 727 indicates this by having a Name field that specifies the "Name" data member and a Value field that is blank indicating this information should be the results obtained by the query.

Figure 16A:
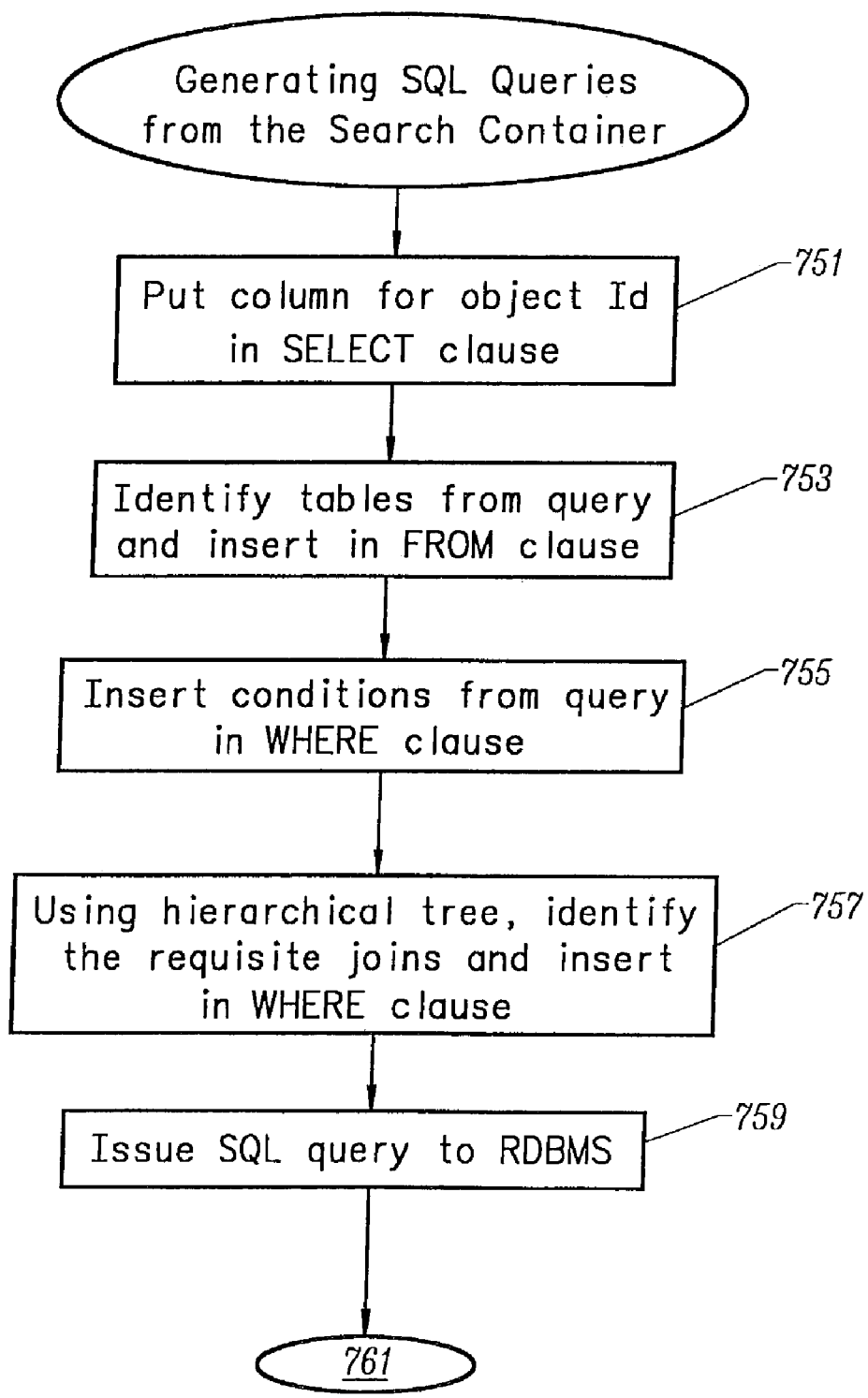
FIGS. 16A and 16B show a process of generating SQL searches utilizing a query container object.
Figure 16B:
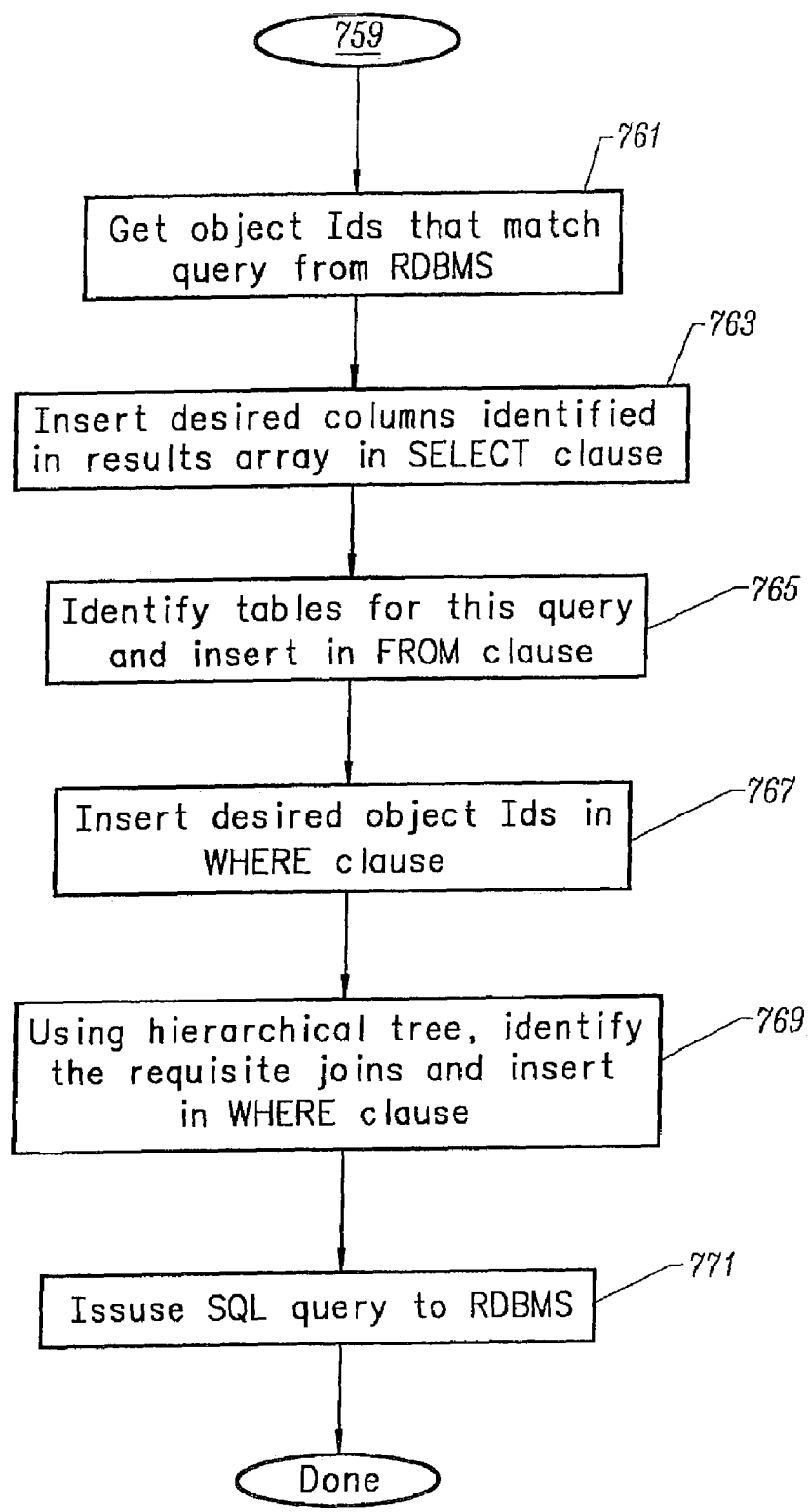

FIGS. 16A and 16B show a process of generating SQL searches utilizing a query container object (see also step 609 in FIG. 13). In some embodiments of the invention, the process shown is performed by the object server. As will be described, what may appear to be a single query may be implemented in multiple SQL queries. However, the invention may ensure that the minimum joins that are necessary are performed as joins are a relatively expensive relational database operation.

The object server will be constructing SQL queries for the RDBMS that retrieve the data of interest. In order to aid the reader's understanding, the process will be described as implementing the query that has been described above where one is searching for the Name data member of objects of class Account that were Last Billed on Apr. 1, 1997 and have a Current Balance greater than 100 dollars.

At step 751, the column for the object Id is put in the SELECT clause. The object server utilizes the hierarchical tree to map the object Id to the associated column in the relational database. The following shows the SQL query that has thus far been generated:

SELECT Account_T.Id FROM WHERE

The object server identifies relational database tables that will be needed to satisfy this query and inserts the tables in the FROM clause at step 753. The object server first identifies all the relational database tables that contain columns to which the data members in the args array are mapped. This involves an analysis of the hierarchical tree and the args array in the query container object. Additionally, the object server determines if any additional tables that are needed for any joins that may be necessary to link the columns in different tables. The following shows the SQL query with the requisite tables:

SELECT Account_T.Id FROM Account_T, Account_Balance_T WHERE

At step 755, the object server inserts conditions from the query specified by the query container object in the WHERE clause. The object server identifies the data members in the args array and uses the hierarchical tree to map the data members to the appropriate columns in the relational database tables. The comparators (e.g., '=' and '>' in this example) are retrieved from the query template. The values to complete the conditions are retrieved from the args array. The following shows the SQL query with the conditions for this example:

SELECT Account_T.Id FROM Account_T, Account_Balance_T WHERE Account_T.Last_Billed="Apr. 1, 1997" and Account_Balance_T.Current_Balance>100

Since SQL specifies that joins are explicitly placed in the query, the object server then uses the hierarchical tree to identify the requisite joins and insert the joins in the WHERE clause at step 757. The process of identifying the requisite joins is similar to the process of identifying all the relational tables for the query at step 753. Accordingly, the steps may be performed at the same time.

The object server identifies the joins that are required by parsing the hierarchical tree to determine the relational database tables (e.g., column) to which each of the data members specified in the query template and args array. For each of the different tables, the object server has to generate a database join to link the two tables (unless that join has already been identified). The following shows the SQL query with the necessary join:

SELECT Account_T.Id FROM Account_T, Account_Balance_T WHERE Account_T.Last_Billed="Apr. 1, 1997" and Account_Balance_T.Current_Balance>100 and Account_T.Id=Account_Balance_T.Id Although in this simple example it is not required, the object server may need to generate multiple joins to link two tables and the joins may include tables that are not immediately apparent from an inspection of the query template and the args array. For example, while the object server is parsing the hierarchical tree, it may identify a table "between" two previously identified tables, therefore creating joins to that intermediate table. By analyzing the hierarchical tree, the invention is able to generate an SQL query that utilizes the minimum number of tables and joins.

Once the SQL query is generated, the object server issues the query to the RDBMS at step 759. The SQL query produced requests the object Ids of all objects of the class Account that satisfy the query. The desired Name data members will identified in a separate SQL query described in FIG. 16B.

Referring now to FIG. 16B, the object server receives from the RDBMS the object Ids of the objects that satisfy the SQL query at step 761. The objects that satisfy the query may include objects that are of subclasses of the Account class. Thus, the invention fully supports inheritance during searching. The user could also have specified a subclass and the SQL query would have joined in a table that would select only objects of that subclass (and those that inherit from that subclass).

At this point, the object server now knows which objects satisfy the query but the query container object has a results array that specifies the Name data member is desired. Therefore, the object server generates a second SQL query to retrieve the desired data members.

At step 763, the object server inserts the desired columns identified in the results array in the SELECT clause. In this example, the results array specifies the Name data member of the class Account. The object server uses the hierarchical tree to map the data member to the appropriate column or columns in the relational database and produces the following initial SQL query:

SELECT Account_T.Name FROM WHERE

The object server identifies the tables for this query and inserts them in the FROM clause at step 765. With this simple example, the only relational database table that is required is Account_T so the SQL query becomes the following:

SELECT Account_T.Name FROM Account_T WHERE

At step 767, the object server inserts the desired object Ids into the WHERE clause. Although many objects (or none) may satisfy a query, assume that the only one that does has an Id data member of 3456. The SQL query will then become the following:

SELECT Account_T.Name FROM Account_T WHERE Account_T.Id=3456

Since the first SQL query found objects that satisfied the query, the same conditions do not have to be put in the second SQL query. At step 769, the object server uses the hierarchical tree to identify any joins that may be required to be inserted in the WHERE clause. With this example, no joins are necessary so the SQL query remains unchanged. The object server then issues the SQL query to the RDBMS at step 771.

As mentioned earlier, one of the advantages of the invention is that a user is able to specify characteristics of data members including default values. Default values may be used to defer allocation of storage space (e.g., memory) for array elements ("lazy allocation"). The default values for array elements are stored in the hierarchical tree that is utilized for parsing and the following discusses how allocation of storage space is deferred.

Figure 17:
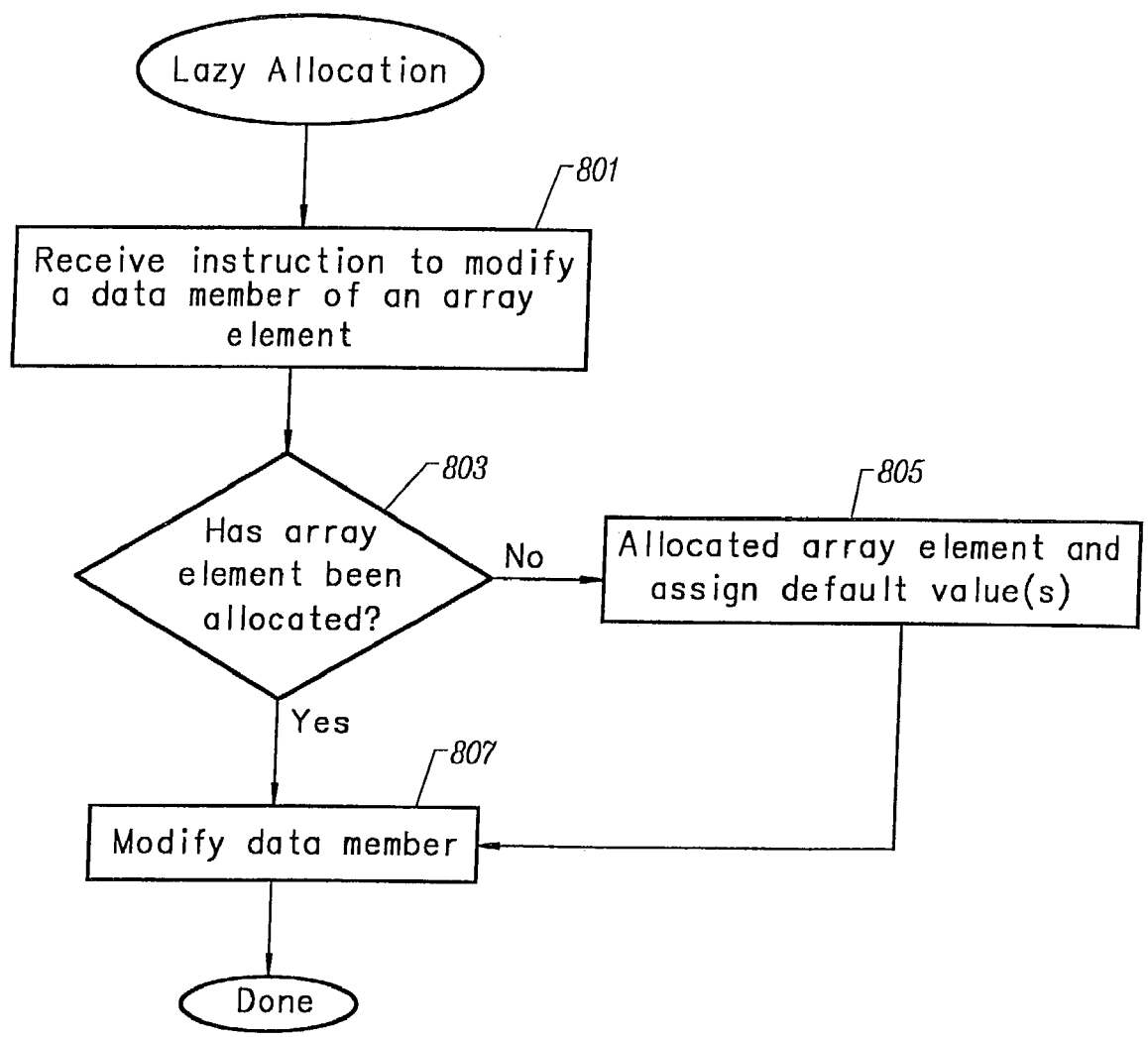
FIG. 17 shows a process of allocating storage space for an array element of an object only if necessary in order to save storage space.

FIG. 17 shows a process of allocating storage space for an array element of an object only if necessary in order to save storage space. If the class (or subclass) definition defines a default value for each data member of an array element and an object of that class is instantiated without specifying a value for a data member of an array element, the system does not allocate storage for the array element. Subsequently, when the system receives an instruction to access or modify a data member of the array element at 801, the system checks if the array element has been allocated as shown at step 803.

If the array element has not yet been allocated storage space, the system allocates storage space for the array element and assigns each data member of the array the appropriate default value from the hierarchical tree at step 805. Once the system has verified that storage space for the array element has been allocated, the system may access or modify the data member (e.g., increment) as instructed at step 807.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. In a computer system, a method of storing objects in a relational database, comprising the steps of:
    defining a class of objects that are to be stored in the relational database, the objects of the class having at least one data member;
    receiving input of a characteristic of the data member;
    mapping the data member to at least one column in at least one relational database table;
    creating the at least one relational database table to store the objects of the class;
    instantiating a container object to store the data member;
    transiently storing the data member in the container object;
    generating a hierarchical tree that represents a definition of the data members of the class of objects;

storing a default value for the data member in the hierarchical tree; and initializing an optional data member.

2. The method of claim 1, further comprising storing a hierarchy of classes in the hierarchical tree.

3. The method of claim 2, wherein the hierarchy of classes includes the class.

4. The method of claim 3, wherein the container object is created utilizing the hierarchical tree, wherein the hierarchical tree comprises a definition of the data member.

5. The method of claim 1, wherein the creating step comprises the steps of:

generating SQL statements for creating the at least one relational database table; and sending the SQL statements to a relational database management system.

6. The method of claim 1, further comprising defining a subclass of objects, wherein the objects of the subclass inherit the data members of the class of objects and have at least one additional data member.

7. The method of claim 6, further comprising storing an object of the subclass in the relational database.

8. The method of claim 6, further comprising the steps of:

generating SQL statements for creating an additional relational database table to store the at least one additional data member; and sending the SQL statements to a relational database management system.

9. The method of claim 1, wherein the at least one data member of the objects of the class comprise an array.

10. The method of claim 9, further comprising late allocation of array elements.

11. The method of claim 1, wherein the characteristic indicates the data member is read only.

12. The method of claim 1, wherein the characteristic indicates the default value for the data member.

13. In a computer system, a method of storing objects in a relational database, comprising the steps of:

defining a first class of objects that are to be stored in the relational database, the objects of the class having at least one data member;

mapping each data member to at least one column in at least one relational database table; and creating the at least one relational database table to store the objects of the class;

abstaining from allocating storage space in the relational database table for the data member;

later changing the data member to a non-default value; and later allocating storage space in the relational database table for the data member.

14. The method of claim 13, further comprising receiving input of a characteristic of the data member.

15. The method of claim 13, wherein defining comprises inheriting a characteristic of the data member from a second class of objects.

16. The method of claim 13, further comprising sending a call to store the object of the class.

17. The method of claim 16, wherein sending a call further comprises storing a pointer to the object.

18. The method of claim 13, wherein defining comprises setting a default value for the data member.

19. The method of claim 18, wherein setting a default value comprises storing the default value in the hierarchical tree.

* * * * *